United States Patent [19]

Lopez et al.

[11] Patent Number: 5,739,469

[45] Date of Patent: Apr. 14, 1998

[54] WIRE HARNESS FOR A CABINET

[75] Inventors: Michael Andrew Lopez; Satoshi Miyajima, both of San Diego, Calif.

[73] Assignees: Sony Corporation, Tokyo, Japan; Sony Electronics Inc., Park Ridge, N.J.

[21] Appl. No.: 696,312

[22] Filed: Aug. 13, 1996

[51] Int. Cl.[6] ................................................. H01B 17/00
[52] U.S. Cl. ........................ 174/72 A; 455/347; 361/826
[58] Field of Search ...................... 174/72 A, DIG. 9; 361/826; 455/347; 312/223.6, 7.2

[56] References Cited

U.S. PATENT DOCUMENTS

| | | | |
|---|---|---|---|
| 3,968,322 | 7/1976 | Taylor | 174/72 A |
| 4,974,798 | 12/1990 | Harding et al. | 248/73 |
| 5,006,960 | 4/1991 | Kallin et al. | 361/390 |
| 5,568,362 | 10/1996 | Hansson | 361/736 |

*Primary Examiner*—Kristine L. Kincaid
*Assistant Examiner*—Dhiru R. Patel

*Attorney, Agent, or Firm*—Pasquale Musacchio; Jerry A. Miller

[57] ABSTRACT

A wire harness for a holding a plurality of wires in a cabinet having a front section and a rear section is disclosed, wherein the front section includes a first inner wall and the rear section includes a second inner wall. The harness includes a first vertical flange extending downward from the first inner wall, wherein the flange includes a slit extending through a first end of the flange and terminating before a second end of the flange to form upper and lower rib elements. Further, the slit forms an opening in the first end for receiving the wires into the slit. The harness further includes a shoulder element having a second vertical flange and a horizontal flange, wherein the second vertical flange extends downward from the second inner wall and is separated from the first vertical flange by an offset distance. Further, the horizontal flange is positioned adjacent the lower rib and separated therefrom by a distance which is less than a thickness of each of the wires, thereby capturing at least one of the wires which is displaced from the slit between the horizontal flange and the first and second inner walls.

4 Claims, 5 Drawing Sheets

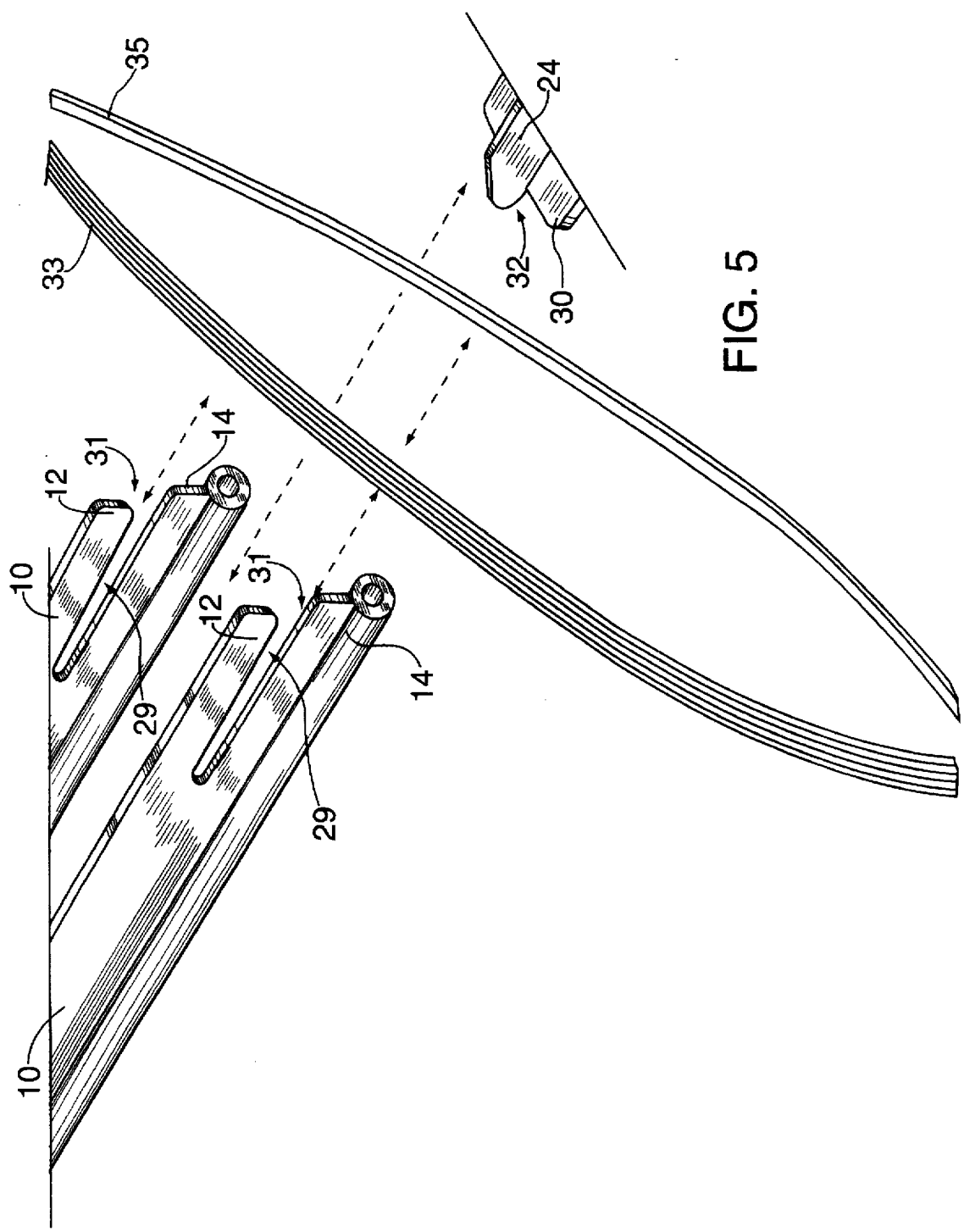

WIRE HARNESS FOR A CABINET

FIELD OF THE INVENTION

This invention relates to cabinets for electronic apparatus, and more particularly, to a wire harness for a television cabinet.

BACKGROUND OF THE INVENTION

Electronic apparatus, such as televisions, include a cabinet in which numerous wires are located amidst various electrical components. It has been found that when contact occurs between the wires and an electrical component, operation of the television may be adversely effected. For example, it has been found that contact between wires associated with a television control panel and a picture tube causes undesirable arcing. As such, it is desirable that the wires within the cabinet do not contact such components. Typically, devices such as wire ties, purse locks, tape, brackets and others have been used in selected locations within the cabinet to hold and maintain bundles of wires away from the components so that no contact occurs. However, this requires that many of such devices be utilized, which results in numerous added parts that substantially increase costs. Further, the installation of such devices is time consuming, thus further increasing costs.

Therefore, it is an object of the present invention to provide a wire harness for a cabinet which substantially decreases costs.

SUMMARY OF THE INVENTION

A wire harness for a holding a plurality of wires in a cabinet having a first section and a second section is disclosed, wherein the first section includes a first inner wall and the second section includes a second inner wall. The harness includes a first vertical flange extending downward from the first inner wall, wherein the flange includes a slit extending through a first end of the flange and terminating before a second end of the flange to form upper and lower rib elements. Further, the slit forms an opening in the first end for receiving the wires into the slit.

The harness further includes a shoulder element having a second vertical flange and a horizontal flange, wherein the second vertical flange extends downward from the second inner wall and is separated from the first vertical flange by an offset distance. Further, the horizontal flange is positioned adjacent the lower rib and separated therefrom by a distance which is less than a thickness of each of the wires, thereby capturing at least one of the wires which is displaced from the slit between the horizontal flange and the first and second inner walls.

These and other objects, advantages and features of the invention will become apparent to those skilled in the art upon consideration of the following description of the invention.

The features of the invention believed to be novel are set forth with particularity in the appended claims. The invention itself, however, both as to organization and method of operation, together with further objects and advantages thereof, may be best understood by reference to the following description taken in conjunction with the accompanying drawing.

BRIEF DESCRIPTION OF THE DRAWINGS

FIG. 5 is a still further embodiment of the present invention wherein the wire harness is utilized in conjunction with a pair of tapered slots.

DETAILED DESCRIPTION OF THE INVENTION

Figure 1:
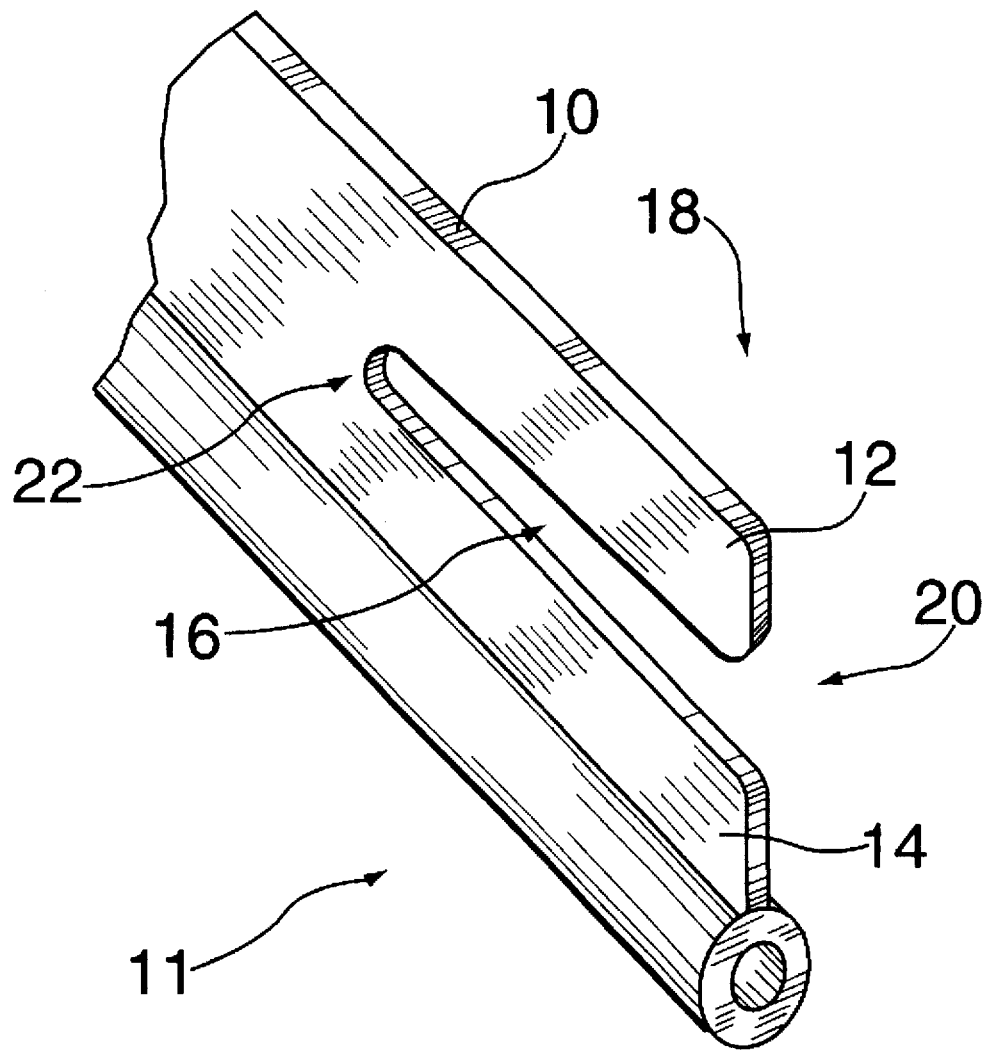
FIG. 1 is a view of a first embodiment of a wire harness in accordance with the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in FIGS. 1-5.

Referring to FIG. 1, an embodiment of a wire harness 11 in accordance with the present invention is shown. The harness 11 includes a first vertical flange 10 which extends downward from an associated inner wall of a cabinet. The first flange 10 includes upper 12 and lower 14 ribs which are separated by a slit 16 having a constant width that is sized for accommodating wires used in a television. The slit 16 extends through a first end 18 of the first flange 10 thus forming a first open end 20 through which the wires are inserted. The slit 16 terminates at a closed end 22, which is opposite the first open end 20, to prevent the escape of wires therefrom. As such, wires may be inserted and removed through the open end 20.

Figure 2:
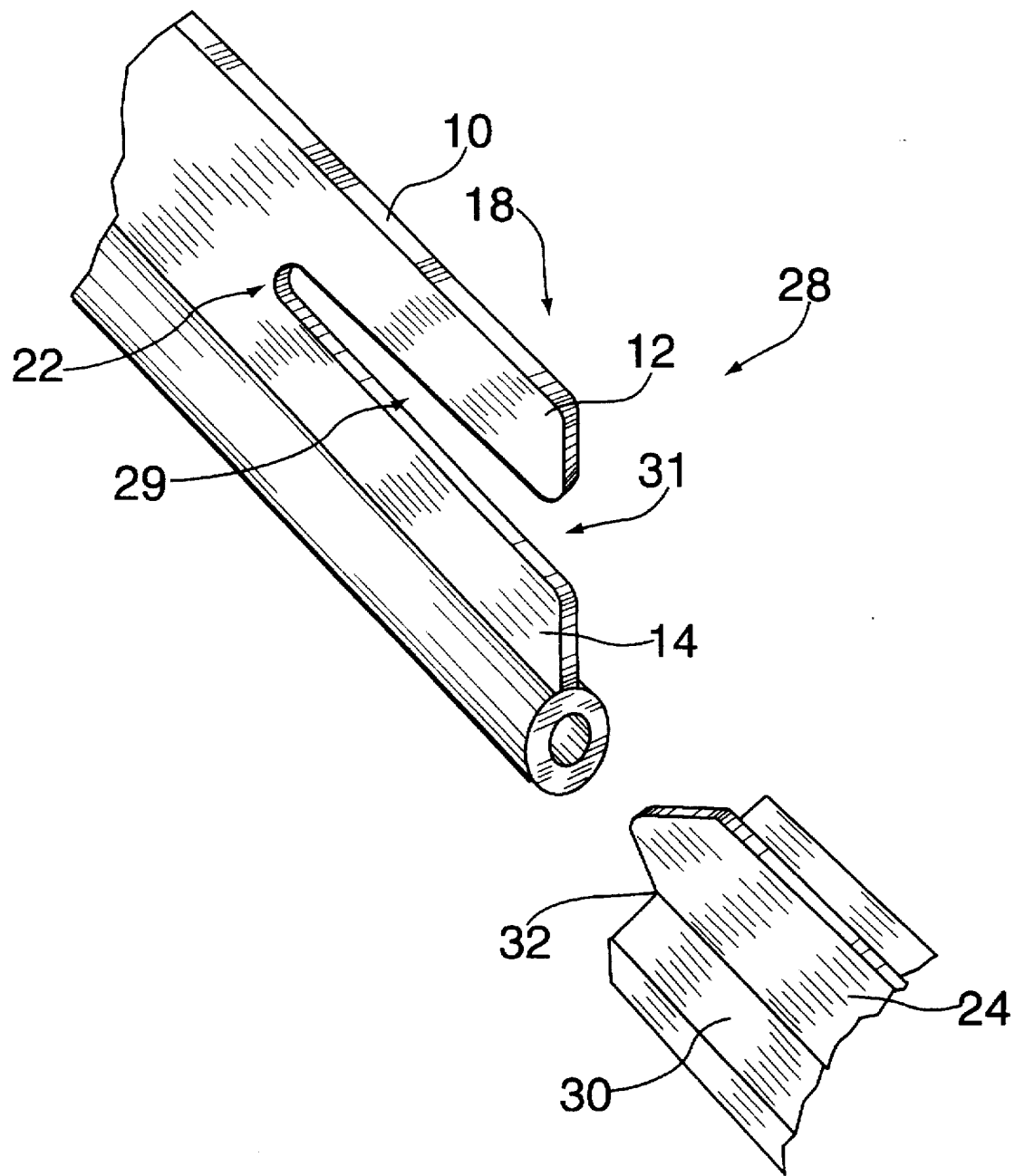
FIG. 2 is a view of an alternate embodiment of the wire harness.

Referring to FIG. 2, an alternate embodiment of a wire harness 28 for holding and positioning wires within a television cabinet is shown. The harness 28 includes the first flange 10, upper 12 and lower 14 ribs and the closed end 22. In accordance with the present invention, the upper 12 and lower 14 ribs are separated by a distance which is greater at the first end 18 than at the closed end 22. This forms a tapered slot 29 having a second open end 31 which is greater than the first open end 20. Referring to FIG. 2 in conjunction with FIG. 3, many television cabinets include a second vertical flange 24 which extends downward from an associated inner wall. The harness 28 further includes a horizontal flange 30 that is formed on a bottom surface 32 of the second flange 24. As will be described, the horizontal flange 30 serves to capture wires, which are displaced from the tapered slot 29, between the horizontal flange 30 and inner walls of the cabinet.

Figure 3:
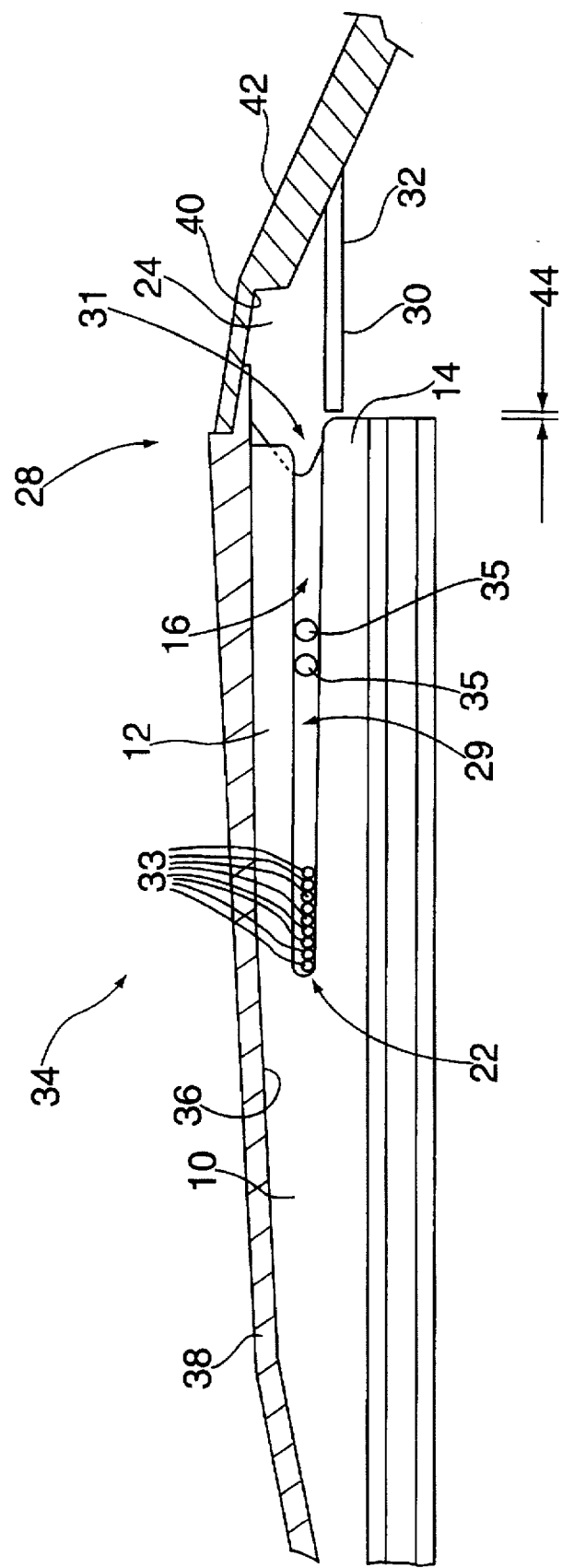
FIG. 3 is a cross sectional side view of the wire harness of FIG. 2 inside a television cabinet.

Referring to FIG. 3, a side cross sectional view of a top portion of a cabinet 34 for a television having a front 38 and rear 42 sections is shown. The first flange 10 extends downwardly from a first inner wall 36 of the front section 38. The second flange 24 extends downwardly from a second inner wall 40 of the rear section 42. The tapered slot 29 may be adapted to accommodate wires of varying sizes. Further, the distance between the upper 12 and lower 14 ribs near the closed end 22 may be smaller than the wires to enable slight wedging of the wires. In use, first wires 33 are inserted into the second open end 31. The first wires 33 are then urged toward the closed end 22 such that they are slightly wedged within the tapered slot 29 to temporary hold the first wires 33 during the manufacturing process. Subsequently, second wires 35, which are larger in size than the first wires 33, may be inserted into the tapered slot 29 and wedged therein.

The horizontal flange 30 is located adjacent to the lower rib 14 and is separated therefrom by a distance which is less than a thickness of each of the first 33 and second 35 wires to form a gap 44. Therefore, wires which move out of the tapered slot 29 are prevented from escaping through the gap 44. Consequently, such wires are captured between the horizontal flange 30 and the first 36 and second 40 inner walls.

Figure 4:
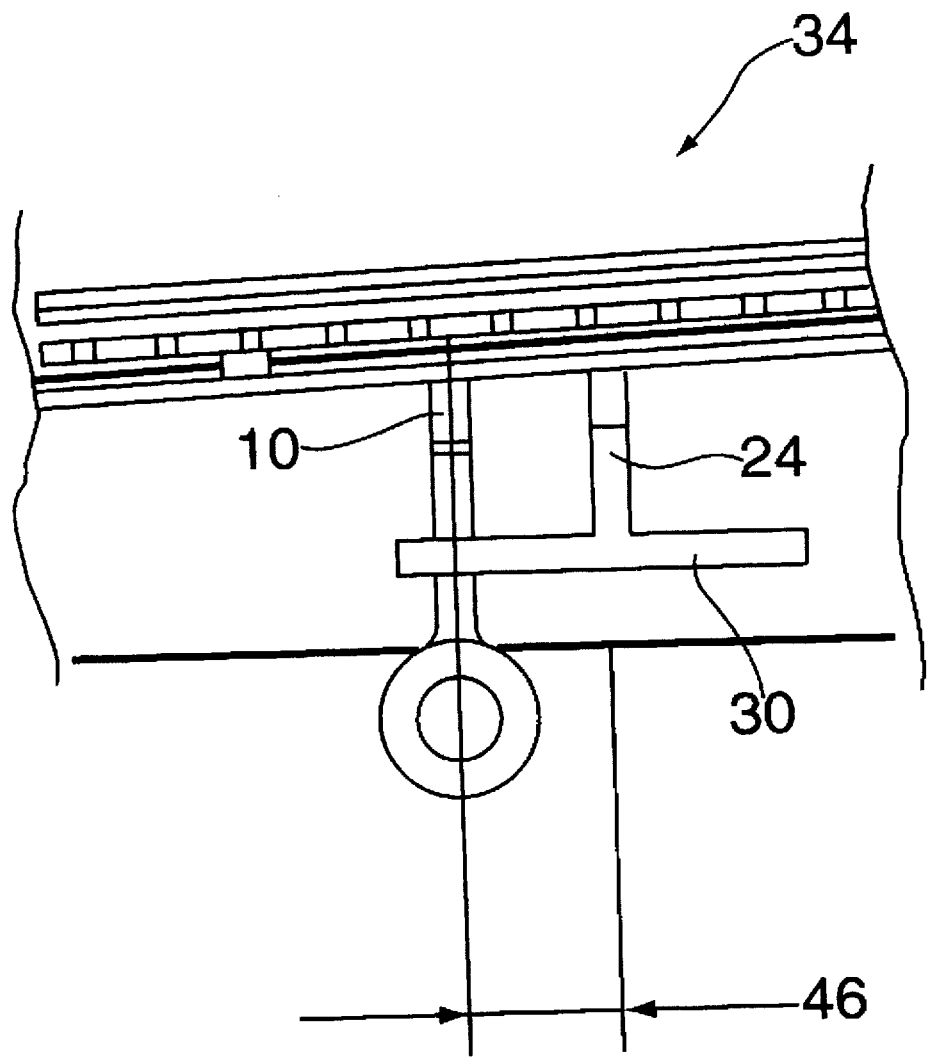
FIG. 4 is a cross sectional rear view of the cabinet which illustrates an offset of a first flange relative to a second flange.

Referring to FIG. 4, a cross sectional rear view of the cabinet 34 is shown. The second flange 24 is offset relative to the first flange 10 such that the second flange 24 is not positioned in line with the first flange 10. In particular, the first 10 and second 24 flanges are separated by an offset distance 46 which is sufficient for ensuring that wires which are displaced from the tapered slot 29 are not pinched between the first 10 and second 24 flanges upon assembly of the front 38 and rear 42 sections. In a preferred embodiment, the offset distance 46 is approximately 5 mm. Further, the horizontal flange 30 is sized so as to span across the first flange 10. Referring to FIG. 5, an alternate embodiment of the present invention is shown. In this embodiment, the horizontal flange 30 is used to capture wires displaced from a pair of first flanges 10 each having a tapered slot 29. In particular, the second flange 24 is positioned between the first flanges 10 such that the horizontal flange 30 is located adjacent to the lower rib 14 of each first flange 10.

Thus it is apparent that in accordance with the present invention, an apparatus that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations are far within the scope of the appended claims.

What is claimed is:

1. A cabinet comprising:

a front section having a first inner wall;

at least one first vertical flange extending downward from said first inner wall, said first vertical flange having a tapered slit extending through a first end of said first vertical flange and terminating before a closed end of said first vertical flange to form upper and lower rib elements, wherein said upper and lower rib elements are separated by a distance which is greater at said first end than at said closed end, said tapered slit being adapted for receiving a single row of wires to enable wedging of each of said wires between said upper and lower rib elements to removably secure each of said wires;

a rear section attached to said front section, said rear section having a second inner wall; and a shoulder element having a second vertical flange and a horizontal flange, wherein said second vertical flange extends downward from said second inner wall and is separated from said first vertical flange by an offset distance, and said horizontal flange is positioned adjacent said lower rib element and separated therefrom by a distance which is less than a thickness of each of said wires, thereby capturing at least one of said wires which is displaced from said tapered slit between said horizontal flange and said first and second inner walls.

2. The cabinet according to claim 1, wherein said offset distance is approximately 5 millimeters.

3. A cabinet, comprising;

front section having a first inner wall;

at least one first vertical flange extending downward from said first inner wall, said flange having a tapered slit extending through a first end of said first vertical flange and terminating before a closed end of said first vertical flange to form upper and lower rib elements, wherein said upper and lower rib elements are separated by a distance which is greater at said first end than at said closed end, said tapered slit being adapted for receiving a single row of wires to enable wedging of each of said wires between said upper and lower rib elements to removably secure each of said wires;

a rear section attached to said front section, said rear section having a second inner wall; and a shoulder element having a second vertical flange and a horizontal flange, wherein said second vertical flange extends downward from said second inner wall and is offset from said first vertical flange to inhibit pinching of at least one of said wires which is displaced from said tapered slit upon positioning of said front section adjacent said rear section, and wherein said horizontal flange is positioned adjacent said lower rib element and separated therefrom by a distance which is less than a thickness of each of said wires, thereby capturing at least one of said wires between said horizontal flange and said first and second inner walls.

4. A wire harness for a cabinet, comprising:

a first vertical flange having a first end and a closed end, said first vertical flange extends downward from a first inner wall;

a tapered slit extending through said first end and terminating before said closed end to form upper and lower rib elements, wherein said upper and lower rib elements are separated by a distance which is greater at said first end than at said closed end, said tapered slit being adapted for receiving a single row of wires to enable wedging of each of said wires between said upper and lower rib elements to removably secure each of said wires; and a shoulder element having a second vertical flange and a horizontal flange, wherein said second vertical flange extends downward from a second inner wall and is separated from said first vertical flange by an offset distance, and said horizontal flange is positioned adjacent said lower rib element and separated therefrom by a distance which is less than a thickness of each of said wires, thereby capturing at least one of said wires which is displaced from said slit between said horizontal flange and said first and second inner walls.

* * * * *